US008385981B2

(12) United States Patent
Kumaran (10) Patent No.: US 8,385,981 B2
(45) Date of Patent: Feb. 26, 2013

(54) SYSTEM AND METHOD FOR CAPTURING AUGMENTED REALITY ELECTRONIC SIGNATURES

(75) Inventor: Ranjith Kumaran, San Jose, CA (US)

(73) Assignee: YouSendIt, Campbell, CA (US)

( * ) Notice: Subject to any disclaimer, the term of this patent is extended or adjusted under 35 U.S.C. 154(b) by 276 days.

(21) Appl. No.: 13/011,914

(22) Filed: Jan. 23, 2011

(65) Prior Publication Data

US 2012/0190405 A1 Jul. 26, 2012

(51) Int. Cl.
*H04B 1/38* (2006.01)
*H04K 3/00* (2006.01)
(52) U.S. Cl. .................................. 455/566; 235/462.11
(58) Field of Classification Search .................. 455/566; 235/462.11
See application file for complete search history.

(56) References Cited

U.S. PATENT DOCUMENTS 6,726,094 B1 * 4/2004 Rantze et al. ................ 235/379
7,140,541 B2 * 11/2006 Stelzer ......................... 235/383

* cited by examiner

*Primary Examiner* — Lee Nguyen
(74) *Attorney, Agent, or Firm* — Fenwick & West LLP (57) ABSTRACT

A system and method for more accurately and easily recording signatures electronically/digitally. The preferred signing experience is generating a "wet" signature by putting a pen to paper as a pen and paper are ubiquitous and portable as well as familiar to most people. The present invention preserves this experience while combining it with a digital rendering of a document using conventional mobile communication devices having a camera feature in order to record a wet signature of a user and store a digital representation of the document that includes the recorded wet signature in the signature block of the document.

20 Claims, 6 Drawing Sheets

SYSTEM AND METHOD FOR CAPTURING AUGMENTED REALITY ELECTRONIC SIGNATURES

FIELD OF THE INVENTION

The application related to the field of electronic signatures and in particular to the capturing of signatures with a mobile personal device assistant device.

BACKGROUND OF THE INVENTION

As more paper-based workflows are managed electronically, such a paperless offices, the need for electronic signatures is increasing. Conventional solutions attempt to replicate the experience of signing a document through the emulation of conventional pen to paper, i.e., "wet," signatures using, for example, touch screen, computer pen, computer mouse or other specialized input device. A system requiring a specialized input device limits the proliferation and adoption of such systems. Using a finger or other device on a touch screens requires the specialized touch screen device and is also slow, cumbersome, unfamiliar to a typical user and frequently results in a signature that is a poor representation of a wet signature. Similarly, the use of specialized hardware such as computer pens are unfamiliar to the typical user as the signature often is misaligned with where the pen touches the screen, and the touch screen sensitivities result in "shaky" signatures. In addition, as described above, the requirement of a specialized pen is a hindrance to adoption of such systems. The use of a computer mouse is also a poor substitute of a wet signature as the use of a mouse to sign a document is unfamiliar and results in signatures that often bear little resemblance to wet signatures. Such poor representations of signatures results in authentication concerns.

Alternatively, conventional electronic signatures can be typewritten, such as the name between backslash characters, "/signature/". However, a problem with this technique is that such signatures are easy to forge and therefore present authentication concerns.

SUMMARY OF THE INVENTION

An embodiment of the invention is a method for associating a digital representation of a wet signature with a digital document that is a digital representation of a document, comprising the steps of: initiating a signature application on a mobile communication device having a camera and a display; displaying the digital document on said display of said mobile communication device; positioning said camera of said mobile communication device over the wet signature wherein a representation of the wet signature is positioned in a signature block of the digital document by said signature application; capturing the wet signature by said camera; and storing, by said signature application, an executed version of the digital document with the wet signature digital representation in said signature block of the digital document.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

A preferred embodiment of the present invention is now described with reference to the figures where like reference numbers indicate identical or functionally similar elements. Also in the figures, the left most digits of each reference number corresponds to the figure in which the reference number is first used.

Figure 1:
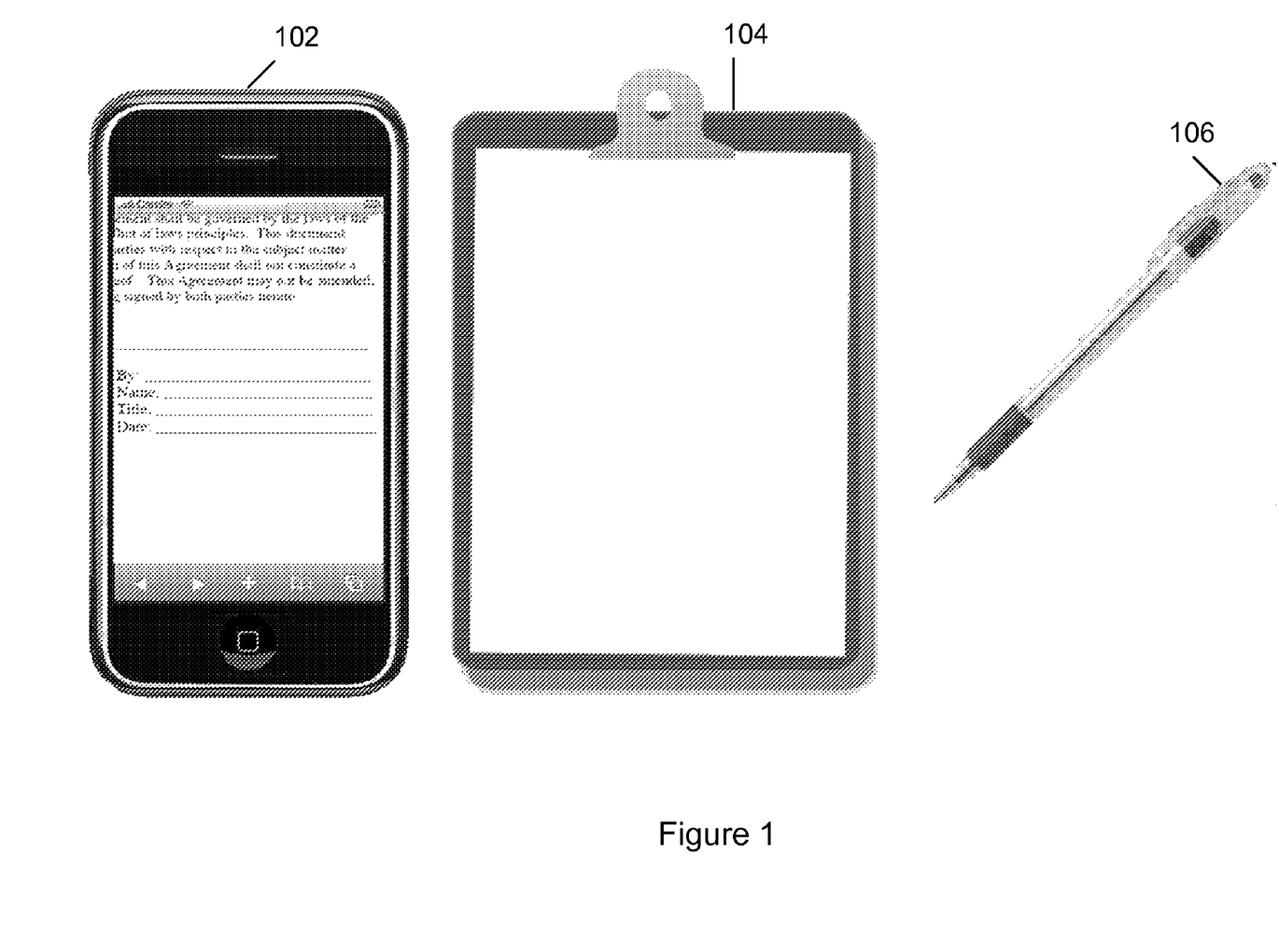
FIG. 1 is an illustration of components of the invention in accordance with an embodiment of the present invention.

FIG. 1 is an illustration of components of the invention in accordance with an embodiment of the present invention. In one embodiment the invention includes a mobile communication device (MCD) 102, paper or other material that can be written upon, for ease of discussion this will be referred to herein as paper 104, but can include any material or object that can be written upon, e.g., desk, hand, blackboard, whiteboard, etc. FIG. 1 also includes a writing device 106, e.g., a pen, marker, pencil, etc.

Figure 2:
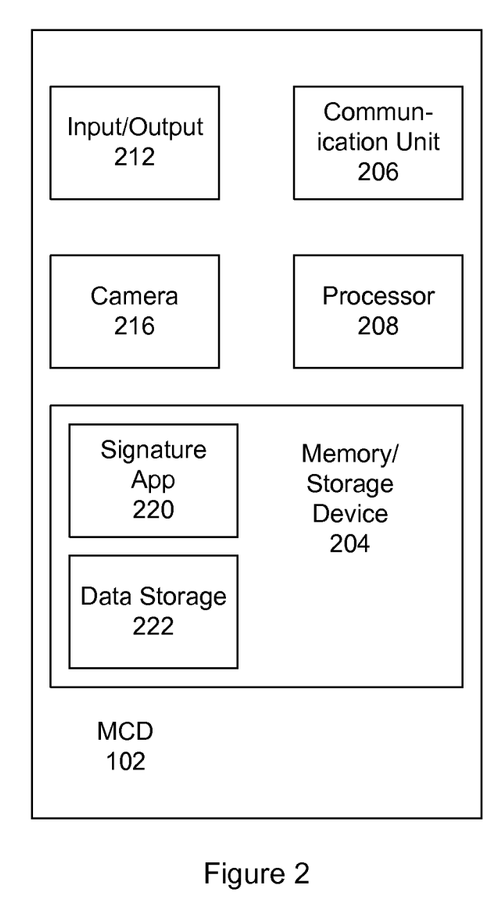
FIG. 2 is a detailed illustration of a mobile communication device in accordance with an embodiment of the present invention.

FIG. 2 is a detailed illustration of a mobile communication device 102 in accordance with an embodiment of the present invention. Examples of a wireless mobile communication device (MCD) 102 include a cellular phone, personal device assistant (PDA), smart phone, pocket personal computer (PC), laptop computer, smart watch or other devices having a processor, communications capability and are easily transportable, for example. Examples of applications include applications available for the iPhone™ that is commercially available from Apple Computer, Cupertino, Calif., applications for phones running the Android™ operating system that is commercially available from Google, Inc., Mountain View, Calif., applications for BlackBerry devices, available from RIM, Ontario Canada, or applications available for Windows Mobile devices, available from Microsoft Corp., Redmond, Wash. Such devices are examples of the MCD 102.

In an embodiment the MCD 102 includes a communications unit 206, a processor 208, an input/output device 212, a camera 216 and a memory/storage device 204. The MCD 102 has an operating system and can include various applications either integrated into the operating system or stored in the memory/storage device 204 and executed by the processor 208. In an embodiment, the memory device 204 includes a data storage module 222, a software module (signature app 220), among other software and programs, for example, that is executed on the MCD 102. The software module can be an application, such as an iPhone™ or Android™-based application. For ease of discussion this software module will be referred to herein as a signature application 220. The signature application 220 can be stored on the MCD 102 and can be part of the embedded software of the MCD 102 (e.g., iPhone) or integrated into the MCD's 102 operating system. Alternatively, the application can be downloaded via a wired or wireless system, e.g., using Apple's iTunes™. In addition, in an embodiment the software module can be part of any of a variety of software paradigms, e.g., software as a service (SaaS), cloud computing. For ease of discussion, the following description will be based on the model of the software module being an application that is stored in the MCD memory module 104 and executed by the MCD processor 208.

Figure 3:
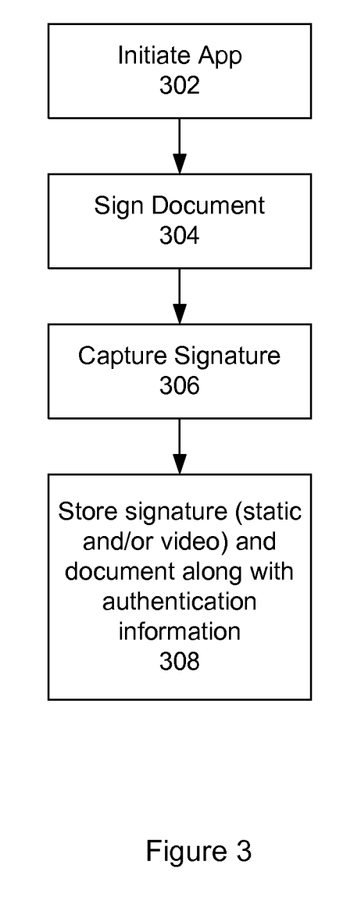
FIG. 3 is a flowchart of a method in accordance with an embodiment of the present invention.

FIG. 3 is a flowchart of a method in accordance with an embodiment of the present invention. Some embodiments of the operation of the invention will be described with reference to FIGS. 4-7.

Figure 4:
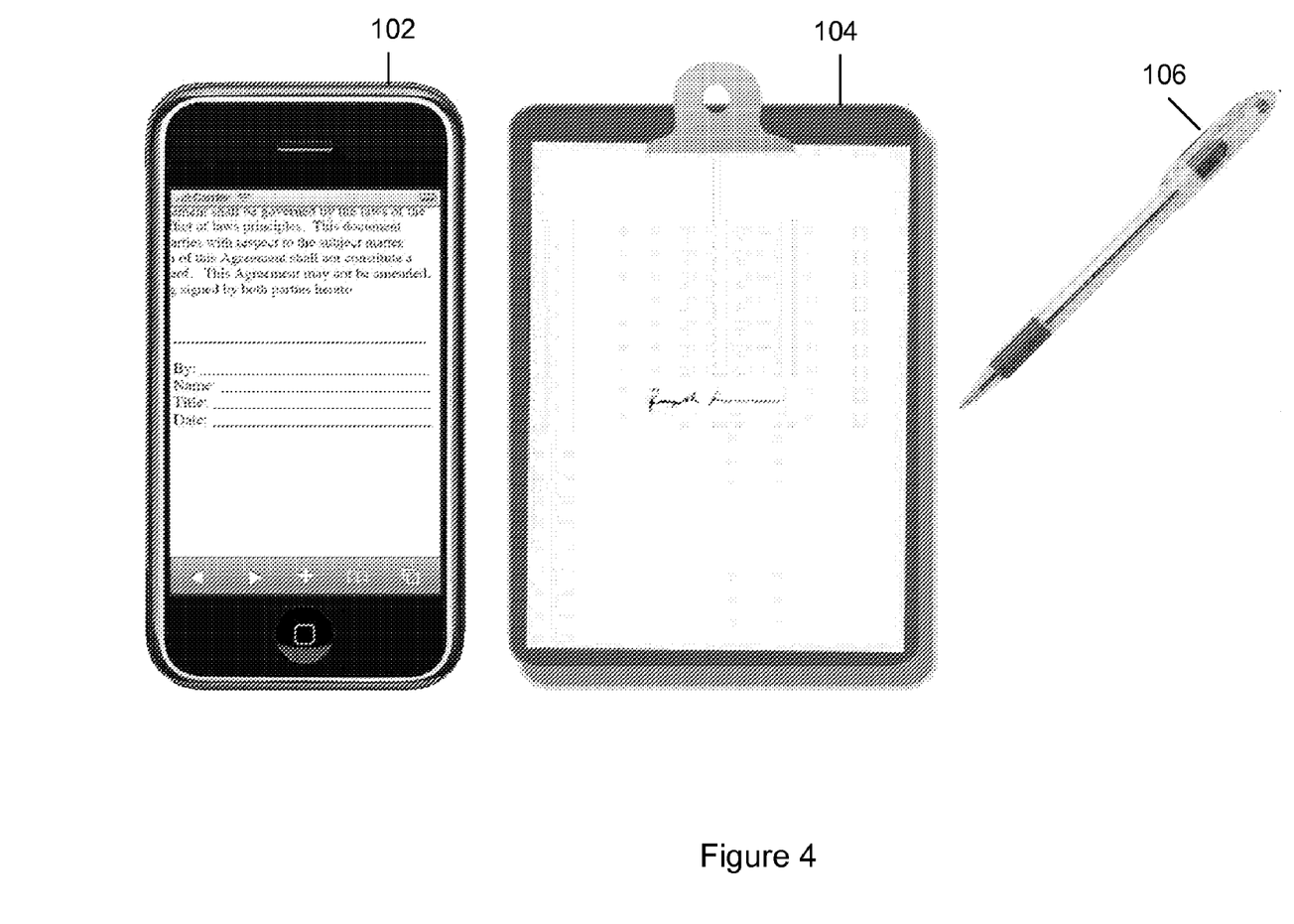
FIG. 4 is an illustration of components of the invention in accordance with an embodiment of the present invention.

FIG. 4 is an illustration of components of the invention in accordance with an embodiment of the present invention. As described above, the present invention is a system and method for more accurately and easily recording signatures electronically. The preferred signing experience is generating a "wet" signature by putting a pen to paper, as a pen and paper are ubiquitous and portable as well as familiar to most people. The present invention preserves this experience while combining it with a digital rendering of a document (referred to herein as a digital document, the digital document need not be created from a physical document, that is, it can be a document created using conventional word processors, e.g., Microsoft Word, and directly stored into a computer readable memory). The digital document is to be signed in a manner that overcomes the drawbacks of conventional electronic signing system and methods, as described above. In particular, MCDs (102) have become common and many MCDs (102) include a camera 216. The present invention uses an MCD 102 to record the signature and/or act of signing and superimposes the signature into the document. The signer or agent can record and save the superimposed signature with the document along with authentication information.

With reference to FIG. 3, a user can initiate 302 the signature application 220 on the MCD 102. The steps set forth in FIG. 3 are illustrative and the steps do not necessarily need to occur in the order shown. The signature application 220 can operate along with a document reading and displaying software, e.g. Microsoft Word, Adobe, etc, or document reading and displaying software can be part of the signature application 220. The document reading/displaying feature provides a digital rendering of the document on the screen of the MCD 102. The signature application 220 can include security protections to enable access only when the security protections are satisfied. Examples of such security include the use of a password, voice recognition, retinal scan, particular location, e.g., within a one mile radius of Fenwick & West LLP in Mountain View, Calif., fingerprint recognition possibly readable only by a device with a specific identifier, e.g., a serial number, SIM (subscriber identity module) card, phone number, etc. The signature application 220 utilizes the MCD camera 216 and identifies the signature block area of the document. In an embodiment, the signature application 302 receives an output from the camera 216, for example a representation of the signature that will be received by the camera 216 when the camera is activated, such as a representation similar to that which may be displayed in a viewfinder, and superimposes the camera output onto the signature block area of the document. In alternate embodiments, other portions of the document can be filled in by the user, e.g., the date or other information at different areas of the document. The signature application can perform these functions using a variety of conventional techniques, e.g., using text field entry, drawing on a touchscreen in various colors, loading previously recorded data, e.g., addresses, system clock for time/date.

With reference to FIG. 4, the user signs 304 the paper 104 using the writing device 106. As seen in FIG. 4, the paper (or other writing surface) signed need not include the text of the document, e.g., the paper can be blank prior to signing. In this embodiment the signature can occur prior to the initiation 302 of the signing application 220.

Figure 5:
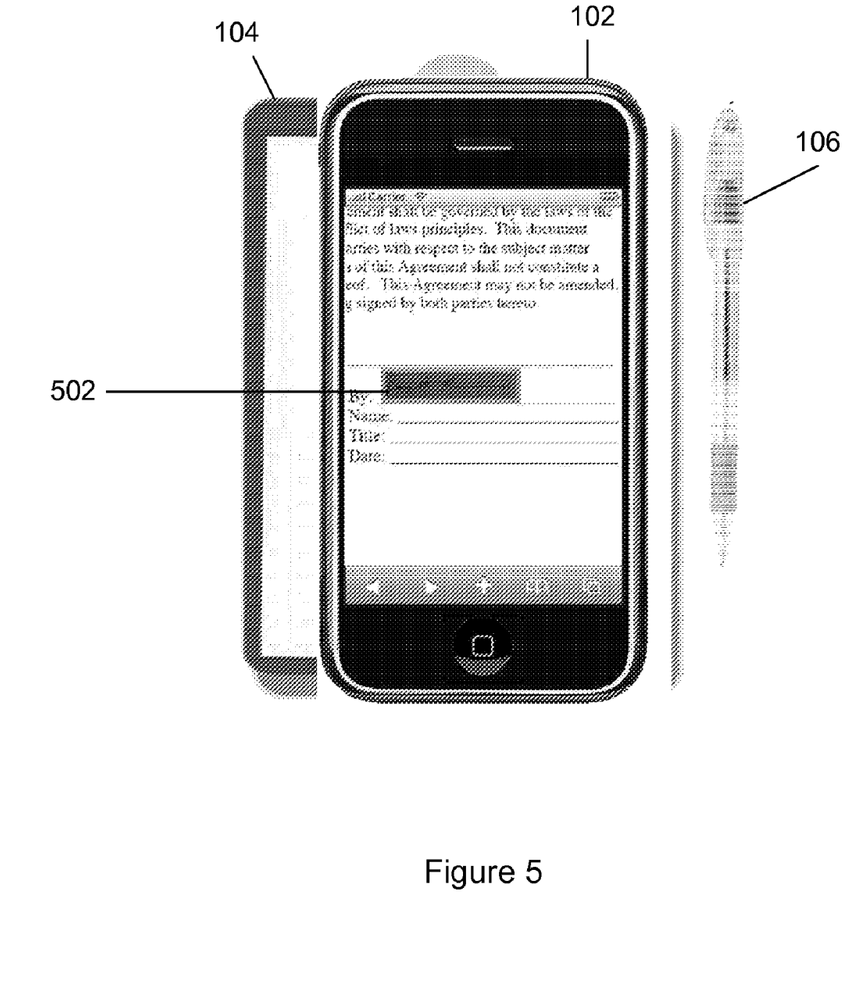
FIG. 5 is an illustration of components of the invention in accordance with an embodiment of the present invention.

FIG. 5 is an illustration of components of the invention in accordance with an embodiment of the present invention. The user places the MCD 102 such that the camera 218 captures the signature on the paper 104 and that the signature appears in the proper location 502 in the electronic document displayed on the MCD 102. The signature application 220 captures 306 the signature, preferably when the signature is displayed in the proper location 502 in the electronic document. In an embodiment the signature capture can occur by the pressing of a button or touching a particular area, e.g., touching the screen on the MCD 102, or using a verbal command, for example. The document is stored 308 in the MCD memory module 204 with the signature and additional data such as the time/date of the signature capture, the location of the signature capture (which can be based upon location identification features of the MCD 102, for example), the authentication information provided by the signature application security features (for example, a password, fingerprint, voice identification or other information that is provided in response to a security information request by the signature application), MCD 102 identification information, retina scan, location information (using global positioning satellite (GPS) information or other location determination information/systems such as cellular tower triangulation based on signal strengths from multiple cellular towers), device identifier, phone number, etc. This information can be stored with the document in the memory module 204, for example as metadata and/or can be stored as a separate file.

The additional data can assist in authenticating the signature. As described above, access to the signature application 220 can require satisfying the security features of the signature application 220 which can assist in authenticating the user of the signature application, the use of a particular MCD 102 as identified by the data can provide additional information to assist in authenticating the signature. There may also be security features required to access the MCD 102 which provides additional security and authentication information.

In addition, since the user uses a writing device 106 and writing surface 104 to create a wet signature, which is consistent with the signature process that the user is accustomed to, the signature itself provides a measure of authentication as the signature can be compared with other signatures of the user. In addition, the additional data collected, as described above, such as the time/date of the signature capture, the location of the signature capture (which can be based upon location identification features of the MCD 102, for example), the authentication information provided by the signature application security features, and/or MCD 102 identification information, for example, also assist in authenticating the signature and the user (person signing the document).

Figure 6:
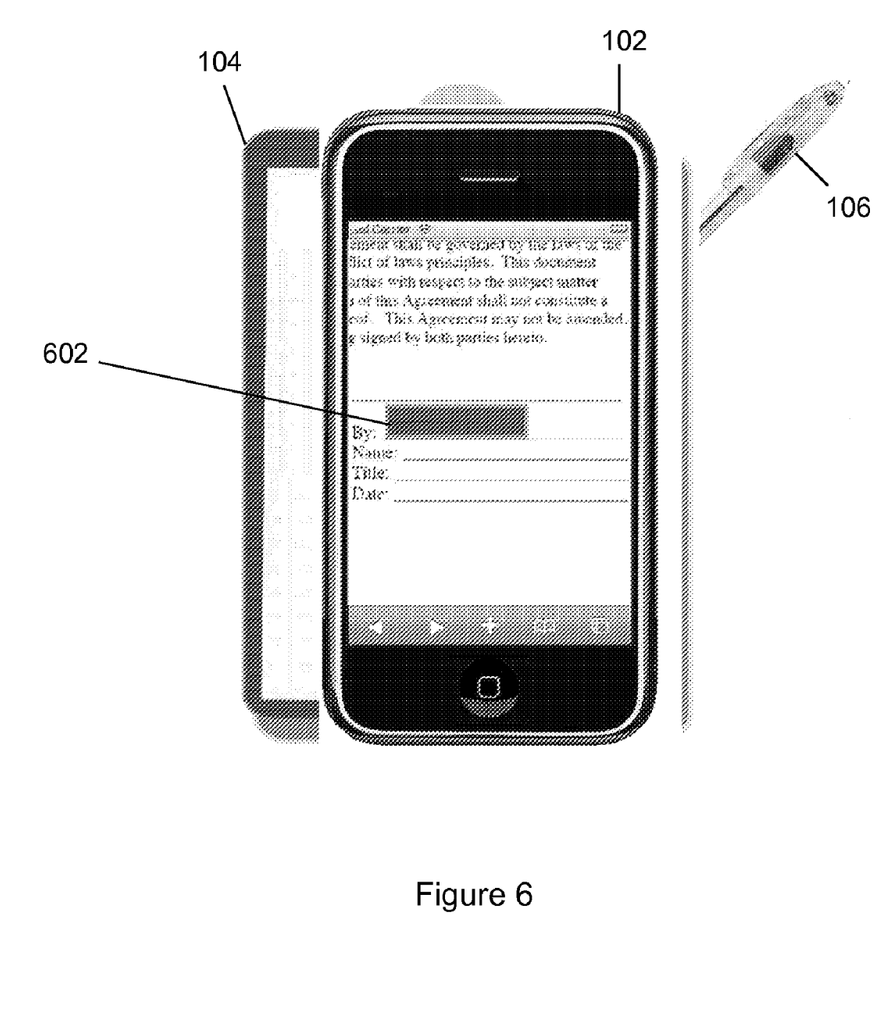
FIG. 6 is an illustration of components of the invention in accordance with an embodiment of the present invention.
Figure 7:
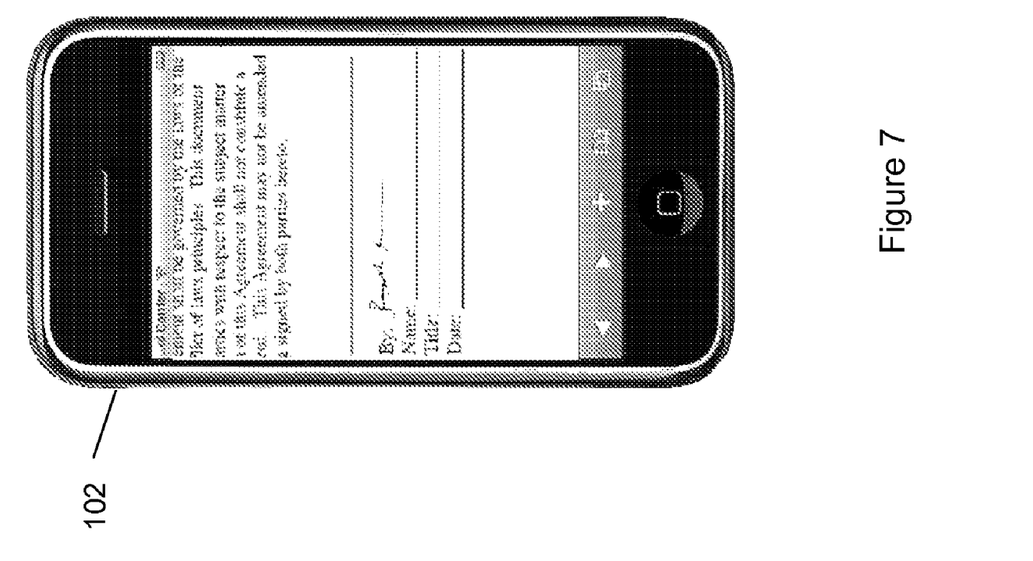
FIG. 7 is an illustration of components of the invention in accordance with an embodiment of the present invention.

FIG. 6 is an illustration of components of the invention in accordance with an embodiment of the present invention. In another embodiment, the signature application 220 captures a video of the signature creation. This can be done using a video capture function of the MCD 102. In one embodiment, after initiation 302 of the signature application 220, the user positions the MCD 102 such that the signature on the paper 104 is positioned such that the signature appears at the proper location 602 of the document representation. The user can select a video capture mode and initiate 306 the video capture. Using the writing device 106, the user signs 304 the document which is captured as a video signature and/or a static digital signature and the captured video and/or static signatures are stored 308 in the memory device 104 as part of the document file and/or as a separate file, for example. In an alternate embodiment, the document and additional information can be transmitted to a storage device (not shown) that is remote from the MCD 102 using, for example, conventional communication methods, e.g., wireless telephone communication network, Bluetooth communication protocol, a WiFi network, etc. FIG. 7 is an illustration of components of the invention in accordance with an embodiment of the present invention. In FIG. 7, the signature is shown in the signature block of the document.

In addition to the information described above that can be stored as part of the signature capture event, the video provides additional information that can be used to authenticate the signature and the user.

Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The invention can also be in a computer program product which can be executed on a computing system.

The present invention also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the present invention is not described with reference to any particular programming language. It will be appreciated that a variety of programming languages may be used to implement the teachings of the present invention as described herein, and any references herein to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for associating a digital representation of a wet signature with a digital document, comprising the steps of:
    initiating a signature application on a mobile communication device having a camera and a display;
    displaying the digital document on said display of said mobile communication device;
    positioning said camera of said mobile communication device over the wet signature wherein a representation of the wet signature is positioned in a signature block of the digital document by said signature application;
    capturing the wet signature by said camera; and
    storing, by said signature application, an executed version of the digital document with the wet signature digital representation in said signature block of the digital document.

2. The method of claim 1, further comprising the step of:
identifying authentication information at substantially the same time as said capturing of the wet signature.

3. The method of claim 2, wherein said authentication information includes at least one of a location of the mobile communication device, a mobile communication device identifier, a time of the capturing of the wet signature, or information provided in response to security requests of said signature application.

4. The method of claim 1, further comprising the step of:
capturing a signature video by the camera of the creation of the wet signature;
wherein said storing step includes storing said signature video.

5. The method of claim 4, wherein said executed version of the electronic document is stored as a first file and said signature video is stored as a second file, wherein said first file is associated with said second file.

6. The method of claim 4, wherein said signature video is part of said executed version of said digital document.

7. The method of claim 4, further comprising the step of:
identifying authentication information at substantially the same time as said capturing of the wet signature.

8. The method of claim 7, wherein said authentication information includes at least one of a location of the mobile communication device, a mobile communication device identifier, a time of the capturing of the wet signature, or information provided in response to security requests of said signature application.

9. A system for associating a digital representation of a wet signature with a digital document, comprising:
a mobile communication device having a camera, a display, a storage device, a processor and a signature application that is executed by said processor;
said display displays the digital document;
said camera is positioned over the wet signature wherein a representation of the wet signature is positioned in a signature block of the digital document by said signature application;
said camera captures the wet signature; and
said mobile communication device storing an executed version of the digital document with the wet signature digital representation in said signature block of the digital document.

10. The system of claim 9, further comprising:
said mobile communication device identifying authentication information at substantially the same time as said capturing of the wet signature.

11. The system of claim 10, wherein said authentication information includes at least one of a location of the mobile communication device, a mobile communication device identifier, a time of the capturing of the wet signature, or information provided in response to security requests of said signature application.

12. The system of claim 9, further comprising:
said camera capturing a signature video of the creation of the wet signature; and
said mobile communication device application storing said signature video.

13. The system of claim 12, wherein said executed version of the electronic document is stored as a first file and said signature video is stored as a second file, wherein said first file is associated with said second file.

14. The system of claim 12, wherein said signature video is part of said executed version of said digital document.

15. The system of claim 12, further comprising:
said mobile communication identifying authentication information at substantially the same time as said capturing of the wet signature by the camera.

16. The system of claim 15, wherein said authentication information includes at least one of a location of the mobile communication device, a mobile communication device identifier, a time of the capturing of the wet signature, or information provided in response to security requests of said signature application.

17. A non-transitory computer readable medium comprising computer executable code which when executed by a computer performs the steps of associating a digital representation of a wet signature with a digital document, comprising the steps of:
initiating a signature application on a mobile communication device having a camera and a display;
displaying the digital document on said display of said mobile communication device;
positioning said camera of said mobile communication device over the wet signature wherein a representation of the wet signature is positioned in a signature block of the digital document by said signature application;
capturing the wet signature by said camera; and
storing, by said signature application, an executed version of the digital document with the wet signature digital representation in said signature block of the digital document.

18. The non-transitory computer readable medium comprising computer executable code of claim 17, further comprising the step of:
identifying authentication information at substantially the same time as said capturing of the wet signature.

19. The non-transitory computer readable medium comprising computer executable code of claim 18, wherein said authentication information includes at least one of a location of the mobile communication device, a mobile communication device identifier, a time of the capturing of the wet signature, or information provided in response to security requests of said signature application.

20. The non-transitory computer readable medium comprising computer executable code of claim 17, further comprising the step of:
capturing a signature video by the camera of the creation of the wet signature;
wherein said storing step includes storing said signature video.

* * * * *